(12) United States Patent
Gutsmann et al.

(10) Patent No.: US 10,940,497 B2
(45) Date of Patent: Mar. 9, 2021

(54) INTELLIGENT SPRAY SYSTEM

(71) Applicant: Bayer CropScience Aktiengesellschaft, Monheim am Rhein (DE)

(72) Inventors: Volker Gutsmann, Langenfeld (DE); Byron Reid, Raleigh, NC (US); Chris Pienaar, Chapel Hill, NC (US); Peter Jardine, Wake Forest, NC (US); Gaelle Fages, Chapel Hill, NC (US); Michael Zimmermann, Raleigh, NC (US)

(73) Assignee: BAYER CROPSCIENCE AKTIENGESELLSCHAFT, Monheim am Rhein (DE)

( * ) Notice: Subject to any disclaimer, the term of this patent is extended or adjusted under 35 U.S.C. 154(b) by 0 days.

(21) Appl. No.: 16/107,347

(22) Filed: Aug. 21, 2018

(65) Prior Publication Data
US 2019/0000066 A1    Jan. 3, 2019

Related U.S. Application Data

(63) Continuation of application No. PCT/EP2017/066609, filed on Jul. 4, 2017.
(Continued)

(30) Foreign Application Priority Data

Jul. 11, 2016 (EP) ..................................... 16178764
Jul. 11, 2016 (EP) ..................................... 16178766

(51) Int. Cl.
*B05B 9/08* (2006.01)
*B05B 12/14* (2006.01)
(Continued)

(52) U.S. Cl.
CPC ............. *B05B 9/08* (2013.01); *A01M 7/0017* (2013.01); *A01M 7/0046* (2013.01);
(Continued)

(58) Field of Classification Search
CPC ....... B05B 9/08; B05B 11/0054; B05B 15/65; B05B 7/32; B05B 7/2475; B05B 9/0888;
(Continued)

(56) References Cited

U.S. PATENT DOCUMENTS 3,904,116 A * 9/1975 Jones .................... B05B 9/0866
                                                    239/127
3,964,689 A * 6/1976 Horvath, Jr. .......... B05B 7/2443
                                                    239/318
(Continued)

FOREIGN PATENT DOCUMENTS

DE    102013109785 A1    3/2015
EP        0718213 A1    6/1996
(Continued)

OTHER PUBLICATIONS

International Search Report dated Oct. 9, 2017, for PCT Application No. PCT/EP2017/066609, filed Jul. 4, 2017, 3 pages.
(Continued)

*Primary Examiner* — Joseph A Greenlund
(74) *Attorney, Agent, or Firm* — Morrison & Foerster LLP

(57) ABSTRACT

The present invention relates to the application of liquid active substances. The subject matter of the present invention is a system, a method and a computer program product for the application of an active substance concentrate from a replaceable cartridge in a diluted form onto a target object with the aid of a portable spray device, wherein important parameters of the spray process are exchanged between the cartridge and/or the spray device and/or an external computer system.

17 Claims, 1 Drawing Sheet

Related U.S. Application Data

Figure 1:
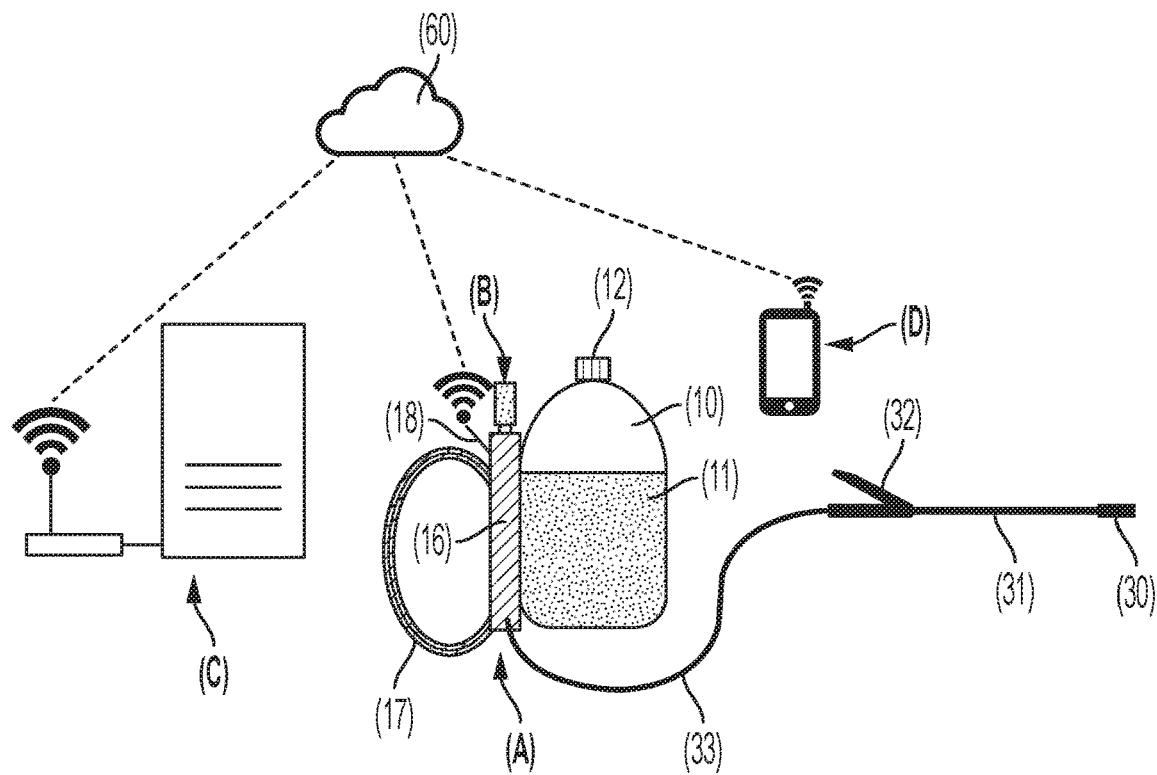

(60) Provisional application No. 62/360,548, filed on Jul. 11, 2016, provisional application No. 62/360,555, filed on Jul. 11, 2016.

(51) Int. Cl.
  *B05B 12/08* (2006.01)
  *A01M 25/00* (2006.01)
  *B05B 11/00* (2006.01)
  *A01M 7/00* (2006.01)
  *B05B 12/12* (2006.01)
  *B05B 7/32* (2006.01)
  *A01M 21/04* (2006.01)
  *B05B 12/00* (2018.01)

(52) U.S. Cl.
  CPC ........ *A01M 7/0092* (2013.01); *A01M 21/043* (2013.01); *A01M 25/006* (2013.01); *B05B 7/32* (2013.01); *B05B 9/0861* (2013.01); *B05B 11/0054* (2013.01); *B05B 12/08* (2013.01); *B05B 12/1436* (2013.01); *B05B 9/0888* (2013.01); *B05B 12/006* (2013.01); *B05B 12/124* (2013.01)

(58) Field of Classification Search
  CPC ............. B05B 12/1436; A01M 7/0045; A01M 7/0092; A01M 24/006; A01M 7/0046; A01M 7/0017
  USPC ............................................ 239/154, 71, 74
  See application file for complete search history.

(56) References Cited

U.S. PATENT DOCUMENTS

| | | | | |
|---|---|---|---|---|
| 3,993,250 A * | 11/1976 | Shure | ............... | B05B 9/0861 239/332 |
| 4,023,020 A * | 5/1977 | Lestradet | ........... | A01M 7/0089 701/50 |
| 4,458,609 A * | 7/1984 | Tofte | ............... | F28D 7/103 111/119 |
| 4,544,084 A * | 10/1985 | Cleland | ........... | B67D 1/0028 137/892 |
| 4,618,099 A * | 10/1986 | Nagao | ............... | B05B 9/0861 222/333 |
| 4,629,164 A * | 12/1986 | Sommerville | ...... | A01M 7/0092 239/69 |
| 4,651,903 A * | 3/1987 | Pagliai | ............... | A01M 7/0046 222/175 |
| 4,790,454 A * | 12/1988 | Clark | ............... | B01F 5/04 222/136 |
| 5,014,884 A * | 5/1991 | Wunsch | ............ | B05B 9/0861 222/333 |
| 5,020,725 A * | 6/1991 | Waldrum | ........ | A01M 7/0028 222/175 |
| 5,150,841 A * | 9/1992 | Silvenis | ............ | B05B 7/0018 137/512.4 |
| RE35,751 E * | 3/1998 | Midgley | ............ | G03G 15/553 399/25 |
| 5,947,392 A * | 9/1999 | Molnar | ............ | B05B 5/1633 239/690 |
| 6,130,695 A * | 10/2000 | Childers | ............ | B41J 2/17506 347/85 |
| 7,320,437 B2 * | 1/2008 | Anderson | ............ | A61D 7/00 239/152 |
| 7,731,062 B2 | 6/2010 | Groys | | |
| 8,224,481 B2 * | 7/2012 | Bylsma | ............ | B01F 13/1066 700/239 |
| 8,596,555 B2 * | 12/2013 | Thompson | ............ | B05B 9/01 239/332 |
| 9,296,551 B2 * | 3/2016 | Klein | ............ | A61M 11/06 |
| 2003/0192964 A1 | 10/2003 | Foster | | |
| 2005/0006400 A1 * | 1/2005 | Shapanus | ............ | B05B 9/0861 222/1 |
| 2005/0121462 A1 * | 6/2005 | Allen, IV | ............ | B05B 9/085 222/31 |
| 2006/0021919 A1 * | 2/2006 | Olson | ............ | B67D 1/0021 210/85 |
| 2006/0102245 A1 * | 5/2006 | Kaechle | ............ | A01M 7/0046 141/18 |
| 2006/0249223 A1 * | 11/2006 | Leer | ............ | A01M 7/0046 141/18 |
| 2006/0261181 A1 * | 11/2006 | Wirz | ............ | A01M 7/0046 239/146 |
| 2006/0261188 A1 * | 11/2006 | Ito | ............ | A61L 9/14 239/306 |
| 2010/0059602 A1 * | 3/2010 | Chiou | ............ | A61L 9/14 239/70 |
| 2010/0219204 A1 * | 9/2010 | Dean | ............ | B05B 9/0888 222/131 |
| 2010/0230515 A1 * | 9/2010 | Wu | ............ | B05B 9/0877 239/373 |
| 2010/0282866 A1 * | 11/2010 | Gilpatrick | ............ | B05B 1/34 239/310 |
| 2012/0173028 A1 * | 7/2012 | Wui | ............ | B05B 15/55 700/283 |
| 2012/0175429 A1 * | 7/2012 | Zupsic | ............ | B05B 7/2467 239/8 |
| 2013/0186977 A1 * | 7/2013 | Fornaro | ............ | B05B 9/0888 239/127 |
| 2013/0193232 A1 * | 8/2013 | Dobias | ............ | A01M 7/0046 239/308 |
| 2013/0255572 A1 * | 10/2013 | Nettesheim | ............ | B65D 85/00 118/600 |
| 2014/0079652 A1 * | 3/2014 | Cooper | ............ | B05B 7/2489 424/59 |
| 2014/0191061 A1 * | 7/2014 | Koontz | ............ | A61L 9/12 239/34 |
| 2014/0212334 A1 * | 7/2014 | Klein | ............ | B05B 7/0012 422/28 |
| 2014/0361097 A1 * | 12/2014 | McLain | ............ | A01B 79/005 239/11 |
| 2015/0075116 A1 * | 3/2015 | Hepburn | ............ | A01M 7/0046 53/431 |
| 2015/0296764 A1 * | 10/2015 | Wirz Luchsinger | ............ | B05B 9/0877 239/120 |
| 2015/0297779 A1 * | 10/2015 | Conroy | ............ | A61L 9/14 239/1 |
| 2016/0067367 A1 * | 3/2016 | Jin | ............ | A61L 9/04 422/4 |
| 2017/0208921 A1 * | 7/2017 | Thiebaut | ............ | A45D 44/005 |
| 2017/0225203 A1 * | 8/2017 | Kloepfer | ............ | B08B 3/026 |
| 2018/0236472 A1 * | 8/2018 | Villar Cloquell | ......... | B05B 7/26 |
| 2019/0000066 A1 * | 1/2019 | Gutsmann | ............ | B05B 7/32 |
| 2019/0351438 A1 * | 11/2019 | Mayer | ............ | B05B 9/085 |

FOREIGN PATENT DOCUMENTS

| | | |
|---|---|---|
| GB | 2213031 A | 8/1989 |
| WO | WO2013030117 A2 | 3/2013 |
| WO | WO2013030117 A3 | 3/2013 |
| WO | WO2013165684 A2 | 11/2013 |
| WO | WO2013165684 A3 | 11/2013 |
| WO | WO2015087805 A1 | 6/2015 |

OTHER PUBLICATIONS

Written Opinion of the International Searching Authority dated Oct. 9, 2017, for PCT Application No. PCT/EP2017/066609, filed Jul. 4, 2017, 9 pages.
International Search Report dated Oct. 5, 2017 for PCT Application No. PCT/EP2017/066611, filed Jul. 4, 2017, 3 pages.
Written Opinion of the ISA dated Oct. 5, 2017 for PCT Application No. PCT/EP2017/066611, filed Jul. 4, 2017, 8 pages.

\* cited by examiner

INTELLIGENT SPRAY SYSTEM

CROSS REFERENCE TO RELATED APPLICATIONS

This application is a continuation application of International Application No. PCT/EP2017/066609, filed internationally on Jul. 4, 2017, which claims the benefit of U.S. Provisional Application Nos. 62/360,548, filed Jul. 11, 2016 and 62/360,555, filed on Jul. 11, 2016, and European Application Nos. 16178766.8, filed Jul. 11, 2016 and 16178764.3, filed Jul. 11, 2016.

The present invention relates to the application of liquid active substances. The subject matter of the present invention is a system and a method for the application of an active substance concentrate from a replaceable cartridge in a diluted form onto a target object with the aid of a portable spray device, wherein important parameters of the spray process are exchanged between the cartridge and/or the spray device and/or an external computer system.

Portable spray devices for the applying of active substances such as pesticides, insecticides, herbicides and fungicides are known (DE102013109785A1, US2006/0249223A1, US2006/0102245A1, US2006/0261181A1, US2005/0006400A1).

Quite common are spray devices known as compression sprayers. These comprise a tank to hold the liquid being sprayed. A usually hand-operated air pressure pump, forming part of the tank, contains a typical piston rod construction and a handle to activate it. This air pressure pump is used to create an air pressure above the liquid being sprayed. The pressurizing of the tank is accomplished in that an attendant periodically activates the pump until a desired tank pressure is achieved. By virtue of the air pressure exerted on it, the spray liquid emerges through a pipe dipping into the liquid in the tank and then flows through a hose, a spray jet valve at the outer end of the hose, an extension pipe, and finally through a spray nozzle and onto the chosen target region.

Pesticides, insecticides, herbicides and fungicides are increasingly being marketed today in the form of concentrates. Concentrates have the advantage of lower transport costs. The user must dilute the active substance prior to use. The dilution instructions are generally found on the package or a package insert.

However, a dilution done by the user is disadvantageous for the following reasons:

The user may come into undesirable contact with the active substance. It is conceivable that the user may make mistakes in the calculating of the quantities of concentrate and diluent. A high viscosity of the concentrate may lead to an imprecise volumetric measuring of the required quantity.

An imprecise dosing of active substances may have a number of undesirable consequences. The treatment of the sprayed object may have no effect or there might be an overdosage. It is conceivable that official regulations on quantities applied will not be adhered to. It is conceivable that mistakes will occur in the inventory control, since the quantities applied have been miscalculated.

The application of active substances will in many instances be carried out by an outside contractor. One example of such a contractor is an exterminator, who is brought in to deal with pests when they occur. For various reasons—including for invoicing or inventory control—it is important or even essential to determine which person at which place has applied which active substance in which amount. Thus far, the detecting of such information has been unsystematic and imprecise.

Moreover, it is conceivable that the entire quantity of active substance will not be used up during an application. Accordingly, a residual amount of active substance concentrate remains in the cartridge. It would be good to know how large this residual amount is, for example in order to decide on which or not this residual amount is enough for a subsequent spraying job.

Starting from the described prior art, the problem to be solved was to organize a more efficient and simple application of active substances, to assist the user during the application so that mistakes in the application are avoided as much as possible, and to have a better grasp of the application.

According to the invention, this problem is solved by the subject matter of the independent claims 1, 9 and 14. Preferred embodiments will be given in the dependent claims and in the present specification.

A first subject matter of the present invention is a method for the application of an active substance involving the following steps:
  providing of a replaceable cartridge, wherein the cartridge contains an active substance concentrate and carries an electronic storage unit,
  providing of a portable spray device, comprising the following components: a container, means of attaching the cartridge to the spray device, a control unit and a spray nozzle,
  filling the container with a diluent,
  attaching the replaceable cartridge to the spray device,
  applying the active substance to one or more target objects by a user, wherein the flow rates of the active substance concentrate and the diluent are controlled by means of the control unit such that the active substance concentrate and the diluent leave the spray device as a mixture with a constant mix ratio via the spray nozzle,
  determining the quantity of applied active substance concentrate by means of the control unit,
  determining the quantity of active substance concentrate remaining in the cartridge by means of the control unit,
  saving the quantity of active substance concentrate remaining in the cartridge in the storage unit,
  relaying of information about the applied active substance, and the quantity of applied active substance, to an external computer system.

Another subject matter of the present invention is a system comprising:
  a portable spray device, having the following components:
    a container to hold a diluent,
    a spray nozzle,
    means of delivering the diluent to the spray nozzle,
    means of reversible connection of a replaceable cartridge containing an active substance concentrate to the spray device,
    means of delivering the active substance concentrate to the spray nozzle, and
    a control unit,
  a replaceable cartridge, comprising means of reversible connecting of the cartridge to the spray device, the active substance concentrate and an electronic storage unit, and
  an external computer system,
  wherein the system is configured such that it determines the quantity of active substance concentrate applied during a spraying process, the quantity of active substance concentrate remaining in the cartridge after the spraying process, and saves this in the electronic storage unit, and it relays information as to a spraying process which has been performed to the external computer system.

A further subject matter of the present invention is a computer program product comprising a data storage medium, on which is stored a computer program, which can be loaded into the random access memory of a computer system where it instructs the computer system to carry out the following steps:

receiving of a mix ratio, actuating of delivery means to deliver a diluent from a container to a spray nozzle and to deliver the active substance concentrate from the cartridge to the spray nozzle, regulating the flow rate of the diluent and/or of the active substance concentrate, so that diluent and active substance concentrate pass as a mixture with the received mix ratio through the spray nozzle, determining of the quantity of active substance concentrate which is delivered by the spray nozzle, determining the quantity of active substance concentrate remaining in the cartridge, saving the quantity of active substance concentrate remaining in the cartridge in the electronic storage unit of the cartridge, relaying the quantity of applied active substance to an external computer system.

According to the present invention, active substance concentrate and diluent are present in separate containers. However, the user need not perform the diluting of the active substance concentrate himself by hand, but instead the mixing is done automatically during the spraying process. In one preferred embodiment, the user does not even have to concern himself with the mix ratio of the active substance concentrate and the diluent; the correct mix ratio is set by a control unit, which is configured such that it can read out information on the mix ratio to be set from a storage unit of the concentrate cartridge.

Furthermore, the quantity of applied active substance is automatically detected and relayed to an external computer system. Since the data is detected automatically, Since the data is detected automatically, it may be used directly for inventory management and/or invoicing and/or other purposes. Errors due to wrong manual entry are avoided.

The residual amount of active substance concentrate remaining after a spray process in the cartridge is likewise determined and saved in a storage unit on the cartridge. By reading out from the storage unit it can thus be determined what residual amount of active substance concentrate is still present in the cartridge; regardless of whether the cartridge is still present on the spray device or has been removed after a spray process from the spray device and has been placed in a warehouse, for example.

The individual elements which characterize the system and the method according to the invention shall be explained more closely hereafter. In this explanation, no distinction shall be drawn between the individual items of the invention (system, method, computer program product). Instead, the following descriptions hold for all items of the invention in analogous manner, regardless of their context.

One component of the present invention is a portable spray device. By portable is meant that the device can be transported by a person without machine aids from one place to another.

Preferably, the spray device is designed such that the user can carry on his back and transport one part of the spray device comprising the container with the diluent (a rucksack device). Another part comprising the spray nozzle can be carried by hand. The container is preferably outfitted with corresponding straps for carrying on one's back.

The spray device comprises a container to hold a diluent. The diluent is used to mix with the concentrate and thereby obtain a dilution of the concentrate.

The diluent is a liquid, as is the concentrate. The term "liquid" will also encompass here solutions, emulsions and suspensions.

In one preferred embodiment, the diluent is water.

The concentrate is preferably an active substance concentrate. By active substance concentrate is meant a formulation of an active substance which is present in concentrated form and which must or should be diluted prior to use. An active substance is a substance or a mixture of substances having a biological action. Examples of active substances are pesticides, insecticides, herbicides and fungicides. In one especially preferred embodiment, the concentrate is a pesticide concentrate. Preferably the pesticide is an agent for control of animal pests, even more preferably an acaricide (for mites/arachnids), an insecticide (for insect pests) or a rodenticide (for rodents).

The container to hold the diluent may consist of any given material which is compatible with the diluent. The term "compatible" means that the material should not be chemically attacked by the diluent and the material should be impermeable to the diluent.

The container may be designed as a tank which can withstand an excess pressure. The excess pressure may be used to deliver the diluent from the tank in the direction of an outlet.

In one preferred embodiment, the container is operated without pressure. Because the container need not withstand any excess pressure, it can be made of a lighter and more thin-walled material.

In a most especially preferred embodiment, the container is designed as a flexible bag. Such a bag preferably has straps so that it can be buckled and worn on the back like a rucksack.

The spray device according to the invention furthermore has means of delivering the diluent from the container in the direction of a spray nozzle. As already described, the diluent may be delivered by means of pressure from the container in the direction of the spray nozzle. This pressure may be generated, for example, with a manually or electrically operated air pump or with a pressure cylinder.

Preferably the diluent is delivered with an electrically operated pump in the direction of the spray nozzle.

The spray device according to the invention comprises a spray nozzle. By the spray nozzle, a desired spatial distribution of the applied mixture can be accomplished. Usually the spray nozzle transforms the liquid passing through it into drops with a specific drop size distribution, depending among other things on the pressure of the liquid, the flow velocity of the liquid, and the geometry of the spray nozzle.

Preferably, the spray nozzle is replaceable, so that a user may select a spray nozzle with a desired drop size distribution and spatial distribution of the sprayed material suitable to the application and the target object.

The spray nozzle may for example be in the form of a wand or a pistol, or some other form. Preferably, it is designed such that it can be held in the hand of the user and be pointed at the target object.

Usually the spray nozzle has a handle, which is activated by the user in order to start a spray process. Usually a valve is opened by activating the handle, so that active substance concentrate and diluent are delivered from their respective containers in the direction of the spray nozzle and through the spray nozzle onto the target object.

In one preferred embodiment, the replaceable spray nozzle and the control unit have means which allow the control unit to detect the presence of a spray nozzle and/or the kind of spray nozzle present. For example, it is conceivable that the control unit will only initiate the delivery of the liquids from their containers in the direction of the spray nozzle if a spray nozzle has also been attached. If no spray nozzle is attached, no delivery will occur, e.g. for safety reasons. Furthermore, it is conceivable that the control unit adapts the parameters for the delivery of the liquids to the type of spray nozzle which is present, in order to make possible an optimal spraying outcome. It is conceivable that a spray nozzle requires a minimum pressure of the incoming liquid in order to generate a desired spatial distribution of the spraying liquid. This minimum pressure could be encoded on the spray nozzle in such a way as to be read by the control unit, so that the user need not set such parameters manually.

A pressure is usually built up upstream from the spray nozzle. It is conceivable that this pressure must lie in a defined range in order to achieve an optimal spraying outcome.

In one preferred embodiment, a pressure sensor is arranged upstream from the spray nozzle and connected to the control unit. By means of the pressure sensor, the control unit regulates the flow of diluent and/or concentrate such that the pressure always remains in a defined range.

Preferably, a valve is arranged upstream from the outlet. This valve can be manually or automatically opened and closed.

Preferably, this valve can be manually activated, so that the user can point the spray nozzle arranged on the outlet at a target object and start the spraying process by manual opening of the valve.

It is also conceivable that the valve is opened automatically. For example, it is conceivable that the spray device has a sensor, which recognizes the position of the spray nozzle in space and automatically opens or closes the valve in a particular position. For example, it is conceivable that the valve is closed when the spray nozzle is pointing at the ground and opened when the spray nozzle is raised and pointing horizontally.

It is also conceivable that the valve is automatically opened when the spray nozzle approaches the target object. This can be accomplished, for example, by means of sensors or GPS-assisted.

The spray device according to the invention moreover comprises means of reversible attachment of a replaceable cartridge to the spray device. The cartridge serves for holding the concentrate. Cartridge and spray device have mutually compatible means of attaching the cartridge to the spray device. Once the cartridge has been attached to the spray device, the concentrate contained in the cartridge can be delivered from the cartridge through parts of the spray device in the direction of the spray nozzle of the spray device.

The attaching of the cartridge to the spray device can be done for example via a screw or a bayonet mounting.

The cartridge is replaceable, that is, it can be attached to the spray device and removed again.

It will preferably be removed again and possibly replaced by another (e.g., anew) cartridge when it has been emptied.

The cartridge is designed so that it is impermeable to the concentrate and is not chemically attacked by the concentrate.

In one preferred embodiment, the cartridge is made at least in part of plastic. Plastics are known for being chemically inert to many materials. Furthermore, they are lightweight, easily processed, and can be given almost any desired form.

In one preferred embodiment, the cartridge is designed as a pressure container. Preferably, it contains, besides the concentrate, a propellant under pressure which is separated from the concentrate. The cartridge preferably has a valve. Preferably the valve is automatically opened when the cartridge is attached to the spray device. The pressurized propellant forces the concentrate out from the cartridge into the spray device. Another valve present in the spray device halts the further flow of the concentrate. This further valve opens preferably when a user starts an application process, usually by activating a handle.

The cartridge preferably designed as a pressure container may consist, for example, of aluminum or tin plate—materials which are pressure-resistant and which are used for example in spray cans (such as shaving cream).

It is conceivable that the cartridge contains a bag with the concentrate, the bag being connected to the valve (valved bag system). The propellant surrounds the bag filled with the concentrate and exerts the necessary pressure to force the concentrate out from the cartridge (see, e.g., DE69820260T2, U.S. Pat. No. 5,505,039, EP0718213A).

But it is also conceivable that propellant and concentrate are separated from each other by a piston (see, e.g., DE3934237A1). The propellant exerts a pressure on the piston. Once the valve is opened, the concentrate is forced by the piston out from the cartridge. For example, it is conceivable to use a ZIMA piston.

The cartridge may be designed as a disposable container or a reusable container.

The cartridge has an electronic storage unit.

By electronic storage is meant all storage media which save information in or on the basis of electronic (semiconductor) components. Examples which can be mentioned are: ROM (read only memory), PROM (programmable read only memory), EPROM (erasable programmable read only memory), EEPROM (electrically erasable programmable read only memory), flash EEPROM (e.g., USB storage sticks), FRAM (ferroelectric random access memory), MRAM (magnetoresistive random access memory) and phase-change RAM (phase-change random access memory). Preferably, the electronic storage unit is a storage unit in which information is saved reversibly and may be erased once more; e.g., information as to the residual amount of active substance concentrate still present in the cartridge after a spray process.

The storage unit saves a degree of dilution or information on the degree of dilution. Several degrees of dilution or information on several degrees of dilution may also be saved. Such a degree of dilution indicates the ratio in which the concentrate and a diluent (usually water) should be mixed together in order to achieve a desired action. Besides the term degree of dilution, the term mix ratio shall also be used in this specification. The terms should be considered synonymous.

The spray device has a control unit. The control unit is able to read out information from the storage unit of the cartridge. The means for readout of the storage unit and the storage unit itself are appropriately attuned to each other.

There are a variety of ways to realize this communication between control unit and storage unit. Several of these ways are described below.

One possibility for the readout is to provide the cartridge with a RFID tag, for example. A RFID tag has a storage unit. Accordingly, the control unit has means of reading out the storage unit in the RFID tag.

In this case, the readout is noncontact. Besides the mentioned form of communication, other kinds of noncontact communication between storage unit and control unit are conceivable, such as Bluetooth or near field communication.

However, the communication may also be by contact. For example, it is conceivable that both the cartridge and the spray device have electrical or optical contacts, which produce an electrical or optical contact between cartridge and spray device when the cartridge is attached to the spray device, by which the control unit may access the storage unit.

Besides the degree of dilution to be set, further information may be saved in the storage unit of the cartridge, such as the kind of active substances, lot numbers, production date, or the like.

The degree of dilution to be set may be saved directly in the storage unit of the cartridge. It is also conceivable that an encoding (character string, identification number or the like) is saved in the storage unit of the cartridge, by means of which the control unit can unambiguously identify the cartridge and/or the concentrate contained in the cartridge. It is conceivable for the control unit to have a register, in which information is kept on a series of concentrates, including the degree of dilution to be set for each concentrate. When the control unit reads out the encoding from the storage unit, it can clearly coordinate the concentrate and determine the corresponding degree of dilution. In this case, the degree of dilution is not saved directly in the storage unit of the cartridge, but instead information is saved by which the degree of dilution can be determined. Since it comes down to the same result (the degree of dilution is determined by the control unit with the aid of information provided by the storage unit of the cartridge), this embodiment in which the degree of dilution is determined with the aid of information in the storage unit of the cartridge by the control unit should be considered the equivalent of the embodiment in which the degree of dilution is saved directly in the storage unit of the cartridge.

The spray device according to the invention has means of delivering the concentrate from the cartridge in the direction of the outlet. Preferably, this is an electrically operated pump. In one especially preferred embodiment, a step motor dispensing pump is used (see, e.g., DE102004047584, WO2012048976, DE 102009006203). Thanks to the step motor drive, even small amounts of the concentrate can be mixed in with the diluent.

The control unit determines the required or desired degree of dilution and regulates the flow of the diluent and/or the concentrate accordingly. Here as well, different variants are possible; several of them shall be described below.

For example, it is conceivable that the diluent is delivered from the container in the direction of the outlet and the flow is determined by means of a flow meter. The flow meter may be connected to the control unit and regulate the flow of the concentrate with the aid of the flow of diluent in the direction of the outlet so that a constant mix ratio is adjusted between concentrate and diluent. thus, while diluent is flowing the flow is metered and precisely enough concentrate is supplied to the diluent so that a mixture results with the desired/required mix ratio (degree of dilution).

Naturally, the reverse variant is also conceivable: the concentrate is delivered in the direction of the outlet, the flow is metered, and precisely enough diluent is supplied to the concentrate so that the desired/required degree of dilution results.

It is also conceivable that the flows of diluent and concentrate are attuned to each other by regulating processes in order to achieve the desired/required degree of dilution. In such a case, both of the flows are detected by means of corresponding sensors.

In one preferred embodiment, the diluent is delivered with a first electrical pump from the container in the direction of the spray nozzle. The flow of diluent is detected with a flow meter and relayed to the control unit. The control unit is connected to a second electrical pump and regulates the flow of the concentrate in the direction of the spray nozzle such that concentrate and diluent leave the spray device via the spray nozzle as a mixture with the desired/required mix ratio.

With a flow meter, the amount of liquid flowing per unit of time in the direction of the spray nozzle is detected. By the amount of liquid is meant, depending on the measurement method used, the volume or the mass.

The flow meter is preferably one which is used commonly in closed pipelines, such as a magnetic-inductive flow meter, a float-type flow meter, an ultrasound flow meter, a Coriolis mass flow meter, a calorimetric flow meter or a vortex flow meter. But it is also conceivable to use a metering orifice or a Pitot tube.

In one preferred embodiment, the flow metering is done with the aid of a differential pressure sensor.

In another preferred embodiment, an impeller sensor is used for the flow metering. The measurement principle is based on the fact that an impeller takes on a rotational speed proportional to the flow velocity of a fluid by which the impeller is being driven. For the measurement of the rotational speed, a permanent magnet can be arranged on the impeller, which moves together with the impeller. A Hall sensor, past which the permanent magnet travels, can be used as a pulse counter. The number of pulses measured per unit of time is proportional to the rotational speed of the impeller and thus to the flow velocity of the fluid.

Details on flow metering may be found, for example, in the following textbook: K. W. Bonfig: Technische Durchflussmessung, Vulkan-Verlag Essen, 3rd edition, 2002, ISBN 3-8027-2190-X.

Via the spray nozzle, the active substance concentrate and diluent leave the spray device as a mixture.

It is also conceivable that diluent and concentrate are brought together in a corresponding feed line immediately before the spray nozzle. But it is also likewise conceivable that a mixing chamber exists upstream from the spray nozzle, into which diluent and concentrate are introduced by two separate feed lines. Then a blending of diluent and concentrate will occur in the mixing chamber, before the mixture leaves the spray device via the spray nozzle.

The blending of diluent and concentrate may be promoted by suitable measures, such as mixing elements.

According to the invention, the amount of active substance applied is detected. In one preferred embodiment, the control unit controls the pump for delivery of the concentrate from the cartridge in the direction of the spray nozzle in order to adjust the desired/required degree of dilution.

Therefore, the control unit also "knows" how much active substance concentrate has been delivered. Disregarding residual amounts remaining behind in the lines of the spray device, the delivered amount corresponds to the applied amount.

This amount is recorded and saved in a storage unit of the control unit.

In one preferred embodiment, the amount of applied active substance or the derived residual amount of active substance concentrate is saved (additionally or solely) in the storage unit of the cartridge. A cartridge usually contains a precisely defined amount of concentrate, if it has not yet been used. If the amount of concentrate delivered from the cartridge in the direction of the spray nozzle is detected, the residual amount results as the difference between the original amount and the delivered amount. If this residual amount or the delivered amount is written back into the storage unit of the cartridge, it can be very easily determined how much active substance still remains in an already used cartridge.

In this way, it can be constantly monitored during the spray process how much active substance is still present. The user can recognize, from the residual amount, whether the amount on hand is enough to accomplish a spray job.

Since the cartridge is replaceable, it is conceivable that the user will remove a not yet entirely emptied cartridge from the spray device after a spray job and place it in a warehouse for a later spray job. At a later time, the user may then determine, by a simple readout of the storage unit, whether the residual amount is enough for the present spray job.

The system according to the invention moreover comprises an external computer system. By the term "external" is meant that the computer system is not usually carried along with the spray device, but instead is generally found at a different location than the one where the spray device is being used. The external computer system is usually a stationary system: while the spray device is used at different locations, the external computer system constantly remains at the same place.

In one preferred embodiment, the system according to the invention moreover comprises a mobile computer system. In contrast to the external computer system, the mobile computer system is carried along with the spray device. In one preferred embodiment, the spray device may be operated via the mobile computer system. It is conceivable that one will connect the mobile computer system for operating the spray device to the spray device by a cable (such as a USB interface). But it is also conceivable that the mobile computer system can communicate via a noncontact interface with the spray device (remote control). It is conceivable that the communication will occur by infrared, ultrasound, Bluetooth or the like.

By means of the mobile computer system the user can recognize, for example, whether the cartridge has been recognized by the spray device, what (residual) amount of concentrate still remains in the cartridge, what pressure has been set in front of the spray nozzle, and much else.

By means of the mobile computer system the user can view the data of the spray device and enter data and control commands.

For example, the user can adjust the pressure in front of the spray nozzle in order to vary the spray profile.

The user for example can initiate the transfer of information on a spray process to the external computer system by means of the mobile computer system.

In one preferred embodiment, the mobile computer system is a mobile telephone (smartphone) with a corresponding software program (such as one in the form of a so-called "app").

After or during a spray process, information about the spray process is transmitted to an external computer system in order to record the spray process for later purposes.

In this process, at least the active substance used and the applied active substance amount are transmitted. Furthermore, information on the user of the spray device (who performed the application), the place of application (for whom was the object sprayed), the application time (how long the application took, when was it done (date, time)) and further information may be transmitted to an external computer system.

This transmission may occur, for example, through mobile communication means (such as GSM=Global System for Mobile communication). A communication via WLAN is also conceivable.

The relaying of the information to the external computer system may occur from various devices. For example, it is conceivable that the control unit of the spray device will establish a link with the external computer system in order to transmit the information. Preferably, a link is established between the mobile computer system and the external computer system in order to relay the information.

This means that information about a spray process is at first relayed from the control unit via a communication channel of short range (such as Bluetooth) to the mobile computer system and then later on information is relayed from the mobile computer system via a communication channel of long range (such as GSM) to the external computer system.

But it is also conceivable that the control unit of the spray device and/or the mobile computer system is connected by a stationary data link (such as USB=Universal Serial Bus) to the external computer system in order to transmit the information.

The invention shall now be explained more closely with the aid of sample embodiments, yet without limiting the invention to these examples.

FIG. 1 shows schematically an embodiment of the system according to the invention. The embodiment comprises a spray device (A), a replaceable cartridge (B), an external computer system (C) and a mobile computer system (D).

The spray device (A) comprises a container (10), which is filled with a diluent (11). The container (10) is designed as a flexible bag and provided with a reclosable closure (12). The spray device (A) comprises straps (17) in order to transport the spray device on one's back. The electronic components (such as the control unit) and the delivery means (such as pumps) are accommodated in a housing (16) and therefore cannot be seen in this figure. The replaceable cartridge (B) is attached to the housing. In the cartridge (B) there is found a concentrate. The bringing together of the concentrate with the diluent occurs inside the housing (16). The diluted concentrate leaves the housing via a flexible hose (33) in the direction of a spray wand (31). The spray wand (31) has a manually operated valve (32) and a spray nozzle (30). If the valve (32) is opened (the handle is operated), the diluted concentrate is then distributed via the spray nozzle.

Exemplary embodiments will now be described, by way of example only, with reference to the accompanying drawings, in which:

FIG. 1 shows an exemplary antenna arranged on a spray device, according to some embodiments.

FIG. 2 shows an exemplary schematic of a system, according to some embodiments.

In FIG. 1, an antenna (18) is arranged on the spray device (A). This antenna is supposed to symbolize that the spray device can link up with the external computer system (C) and/or the mobile computer system (D) in order to transfer data. The data transfer need not necessarily be wireless. The cloud (60) represents a network which is formed by the external computer system (C), the spray device (A) and/or the mobile computer system (D).

The mobile computer system (D) is designed as a so-called smartphone.

Figure 2:
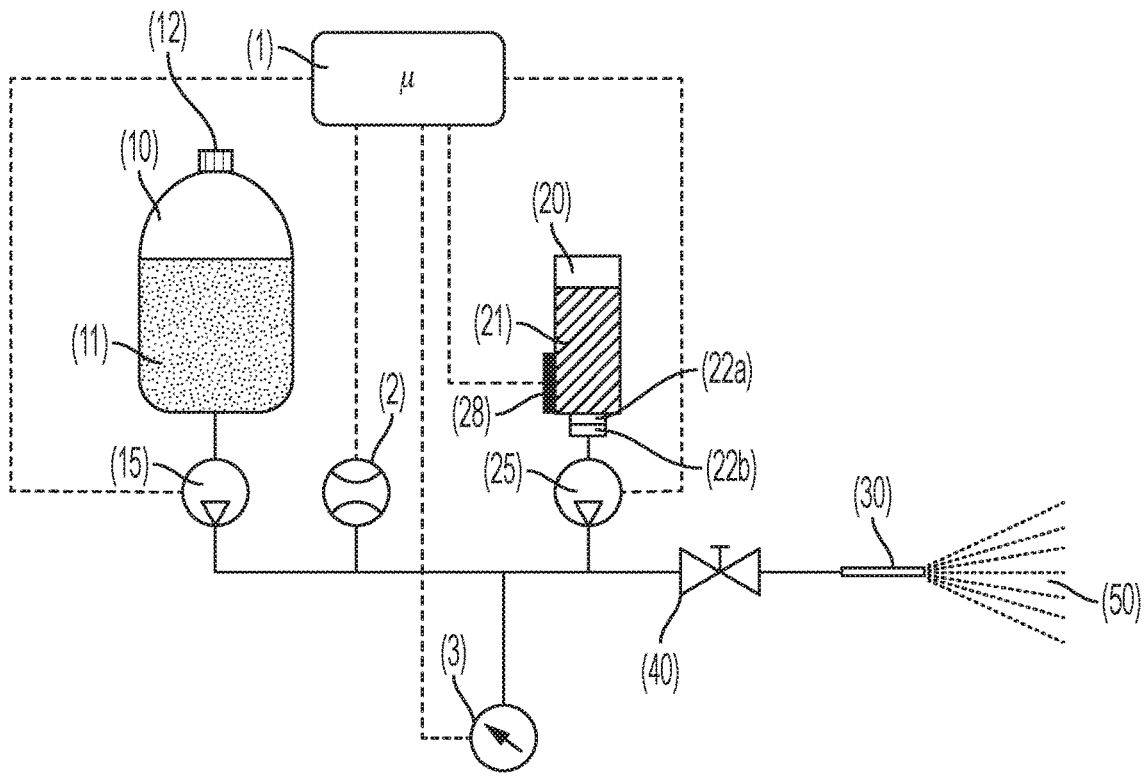

FIG. 2 shows schematically preferred embodiments of the components of the system according to the invention. The system comprises a spray device according to the invention and a cartridge according to the invention.

The spray device according to the invention comprises a container (10) with a diluent (11), a spray nozzle (30), a first pump (15) for delivery of the diluent (11) from the container (10) in the direction of an outlet (30), a valve (40), means (22b) of attaching the replaceable cartridge (20), a second pump for delivery of a concentrate (21) present in the cartridge (20) from the cartridge (20) in the direction of the spray nozzle (30), a flow meter (2) for metering the flow of the diluent (11) from the container (10) in the direction of the spray nozzle (30), a pressure meter (3) and a control unit (1).

The container (10) is designed as a flexible bag and has a reclosable closure (12).

The means (15) for delivery of the diluent (11) from the container (10) in the direction of the spray nozzle (30) are represented schematically FIG. 1 by an arrow, indicating only the direction of flow. The arrow does not mean that the corresponding means must be located at this place in the feed line.

The diluent and the concentrate leave the spray device via the spray nozzle in the form of a mixture (50) with a constant mix ratio.

The cartridge (20) according to the invention contains the concentrate (21). The cartridge has means (22a) of reversible attachment of the cartridge (20) to the spray device. The cartridge (20) according to the invention moreover has a storage unit (28).

The control unit (1) has access to the storage unit (28) (the access is represented by the broken line).

The control unit (1) furthermore stands in connection with the flow meter (2), the pressure meter (3), the pump (15) and the pump (25). If the valve (40) is opened (manually or automatically), the diluent (11) is delivered by the pump (15) from the container (10) in the direction of the outlet (30). By means of the flow meter (2), the flow of the diluent (11) is detected. The control unit (1) on the basis of the flow measured by the flow meter (2) regulates the amount of concentrate (21) supplied by means of the pump (25) to the diluent (11), so that the mix ratio read out from the storage unit is adjusted. Furthermore, the control unit adjusts the flows of diluent (11) and concentrate (21) such that the pressure upstream from the spray nozzle (measured by the pressure meter (3) is present in a predefined range in order to create a desired spray profile.

A typical usage of the system shown in FIG. 1 and of the components shown in FIG. 2 is as follows:

A user opens the container (10) by removing the reclosable closure (12). The user fills a diluent (11), preferably water, into the container (10) and closes the container (10) by means of the closure (12).

The user takes a cartridge (B, 20) with a concentrate (21) contained therein. The cartridge (B, 20) may be a new one; but it is also conceivable for the cartridge to have been used already.

The user attaches the cartridge (B, 20) to the spray device. For this, he uses the complementary connection means (22a) and (22b).

The control unit (1) reads either automatically or triggered by an action of the user the information from the storage unit (28) of the cartridge (B, 20). This information may be information about the concentrate (21), the (residual) amount of concentrate (21) contained in the cartridge and/or a mix ratio to be set.

It is also conceivable for an identification number to be saved in the storage unit (28); the control unit (1) reads out this identification number, and determines on the basis of an internal register the identity of the cartridge (B, 20) and the contained concentrate (21).

In any case, the control unit (1) reads out data from the storage unit (28) of the cartridge (B, 20) and is then able to adjust a mix ratio for the diluent (11) and the concentrate (21).

The user directs the spray nozzle (30) at a target object and opens the valve (40). A diluted concentrate emerges via the spray nozzle (30). The user can vary the spray profile. This is done by increasing or decreasing the pressure upstream from the spray nozzle (30). The variation of the spray profile can occur either directly or via a corresponding data entry device on the spray device (A) (which can communicate with the control unit) or by means of the mobile computer systems (D), acting as a remote control.

During the spray process, the amount of concentrate delivered is ascertained. The residual amount of concentrate in the cartridge may optionally be indicated to the user—by a corresponding indicator device on the cartridge, on the spray device and/or on the mobile computer system. It is also conceivable that the time span for which the available residual amount is sufficient if spray conditions are held constant will be indicated in place of or in addition to the residual amount still present.

After the spray process has been ended, information on the residual amount of the concentrate may be written back into the storage unit of the cartridge.

The user may document the conclusion of the spray job by an entry on the data entry device of the spray device or the mobile computer system (D). Information about the completed spray process will be assembled in this case. Such information might be: amount of applied concentrate, residual amount of concentrate in the cartridge, user, spray nozzle used, spray pressure used, length of the spray process, spray location, concentrate used, and more.

This assembled information may be saved in a storage unit of the spray device, in the storage unit of the cartridge, in a storage unit of the mobile computer system and/or in a storage unit of the external computer system (C).

In any case, such information is transmitted either directly after completion of the spray job or at a later time, either triggered by the user or automatically, to the external computer system (C). The transmission is wireless or via a connection of the corresponding component on which the information is saved to the external computer system (C).

The information is then present on the external computer system (C) and can be used for various purposes: inventory control, invoicing, logistical planning, documentation for the authorities, etc.

The invention claimed is:

1. A portable spray device that can be carried by a user comprising:

a container configured to contain a liquid diluent;

a connector configured to removably connect to a cartridge comprising an electronic storage and containing an active substance concentrate comprising a pesticide, an insecticide, an herbicide or a fungicide, wherein the electronic storage comprises a radio-frequency identification (RFID) tag;

a spray nozzle in fluid communication with the container and the cartridge and configured to be held by the user and directed by the user at one or more target objects; and a control unit configured to:

read out information from the electronic storage of the cartridge connected to the spray device, wherein the read-out information comprises a quantity of the active substance concentrate contained in the cartridge connected to the connector, determine a specific quantity of active substance concentrate that was applied during a spraying process to apply the active substance concentrate to the one or more target objects, save information to the electronic storage after the spraying process, the information comprising a residual quantity of the active substance concentrate contained in the cartridge after the spraying process, wirelessly transmit information concerning the spraying process to an external computer device, wherein the transmitted information comprises the determined specific quantity of the applied active substance concentrate, and wirelessly communicate with a mobile computer system configured to be carried by the user with the portable spray device.

2. The portable spray device of claim 1, wherein the information concerning the spraying process comprises information about one or more of: the residual quantity of active substance concentrate contained in the cartridge after the spraying process, an identification of the active substance concentrate applied during the spraying process, a spray pressure used, and the spray nozzle used.

3. The portable spray device of claim 1, wherein the mobile computer system is a smartphone with a software application for operating the spray device.

4. The portable spray device of claim 1, wherein the mobile computer system is configured to provide the residual quantity of the active substance concentrate to the user based on the information saved in the electronic storage to enable the user to determine whether enough active substance concentrate is present for a subsequent spraying process.

5. The portable spray device of claim 1, wherein the control unit is configured to:

determine a degree of dilution to apply to the active substance concentrate based on the information read out from the electronic storage of the cartridge; and regulate a flow of the liquid diluent and the active substance concentrate to result in the determined degree of dilution.

6. A spray system, comprising:

i) a portable spray device that can be carried by a user comprising:

a container configured to contain a liquid diluent;

a connector configured to removably connect to a cartridge comprising an electronic storage and containing an active substance concentrate comprising a pesticide, an insecticide, an herbicide or a fungicide, wherein the electronic storage comprises a radio-frequency identification (RFID) tag;

a spray nozzle in fluid communication with the container and the cartridge and configured to be held by the user and directed by the user at one or more target objects; and a control unit configured to:

read out information from the electronic storage of the cartridge connected to the spray device, wherein the information comprises a quantity of active substance contained in the cartridge connected to the connector, determine a specific quantity of active substance concentrate that was applied during a spraying process to apply the active substance concentrate to the one or more target objects, save information to the electronic storage after the spraying process, the information comprising a residual quantity of the active substance contained in the cartridge after the spraying process, and wirelessly transmit the determined specific quantity of applied active substance concentrate to a mobile computer system; and ii) the mobile computer system carried with the portable spray device and configured to be in wireless communication with the portable spray device to aid the user in operating the spray device.

7. The spray system of claim 6, wherein the portable spray device is configured to wirelessly transmit information concerning the spraying process to the mobile computer system.

8. The spray system of claim 7, wherein the mobile computer system is configured to transmit the information concerning the spraying process to an external computer system.

9. The spray system of claim 8, wherein the information concerning the spraying process comprises information about one or more of: information about a user of the spray device, information about a place of application of the spraying process, and information on an application duration of the spraying process.

10. The spray system of claim 7, wherein the information concerning the spraying process comprises information about one or more of: the quantity of active substance concentrate applied during the spraying process, the residual quantity of active substance concentrate contained in the cartridge after the spraying process, an identification of the active substance concentrate applied during the spraying process, a spray pressure used, and the spray nozzle used.

11. The spray system of claim 7, wherein the information wirelessly transmitted from the portable spray device to the mobile computer system comprises the determined quantity of the active substance concentrate applied during the spraying process.

12. The spray system of claim 6, wherein the mobile computer system is a smartphone with a software application for operating the spray device.

13. The spray system of claim 6, wherein the mobile computer system is configured to wirelessly receive the residual quantity of the active substance concentrate from the portable spray device and provide the residual quantity of the active substance to the user to enable the user to determine whether enough active substance concentrate is present for a subsequent spraying process.

14. A method for applying an active substance mixture using a portable spray device that can be carried by a user comprising:

filling a container of the portable spray device with a liquid diluent;

removably connecting a cartridge comprising an electronic storage and containing an active substance concentrate to the portable spray device, wherein the active substance concentrate comprises a pesticide, an insecticide, an herbicide or a fungicide, wherein the electronic storage comprises a radio-frequency identification (RFID) tag;

spraying a mixture of the liquid diluent and the active substance through a spray nozzle of the spray device, wherein the spray nozzle is held by the user and directed by the user at one or more target objects;

determining a specific quantity of the active substance concentrate that was applied during a spraying process to apply the active substance concentrate to the one or more target objects;

saving information to the electronic storage unit after the spraying process, the information comprising a residual quantity of the active substance concentrate remaining in the cartridge after the spraying process;

wirelessly transmit information concerning the spraying process to an external computer device, wherein the transmitted information comprises the determined specific quantity of applied concentrate; and wirelessly communicate the information with a mobile computer system configured to be carried by the user with the portable spray device.

15. The method of claim 14, wherein the information concerning the spraying process comprises information about one or more of: the residual quantity of active substance concentrate contained in the cartridge after the spraying process, an identification of the active substance concentrate applied during the spraying process, a spray pressure used, and the spray nozzle used.

16. The method of claim 14, wherein the mobile computer system is a smartphone with a software application for operating the spray device.

17. The method of claim 14, comprising:
enabling the mobile computer system to wirelessly receive the residual quantity of the active substance concentrate from the portable spray device and provide the residual quantity of the active substance concentrate to the user to enable the user to determine whether enough active substance concentrate is present for a subsequent spraying process.

* * * * *